Jan. 3, 1961  W. G. WAMPACH  2,966,752
CRANES
Filed Sept. 6, 1955  7 Sheets-Sheet 2
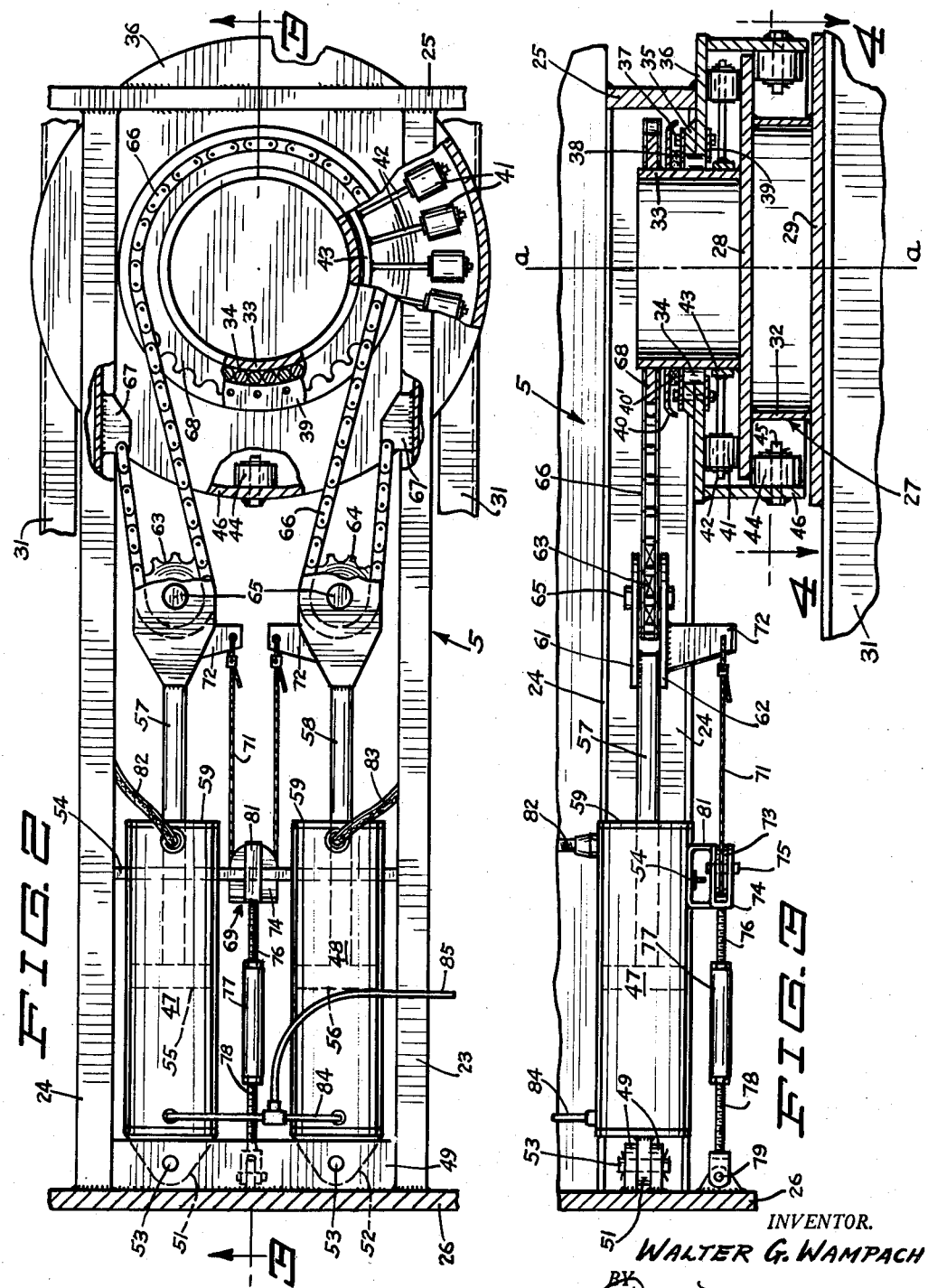
INVENTOR.
WALTER G. WAMPACH
BY
Paul, Moore & Dugger
ATTORNEYS Jan. 3, 1961 W. G. WAMPACH 2,966,752
CRANES
Filed Sept. 6, 1955 7 Sheets-Sheet 3
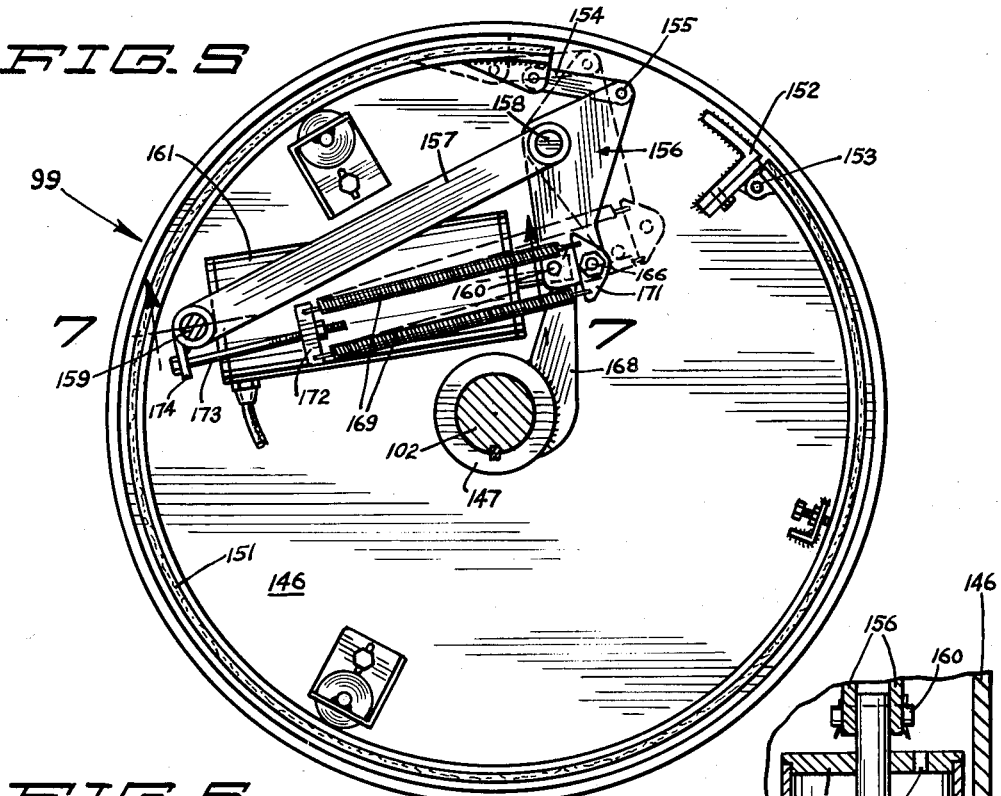
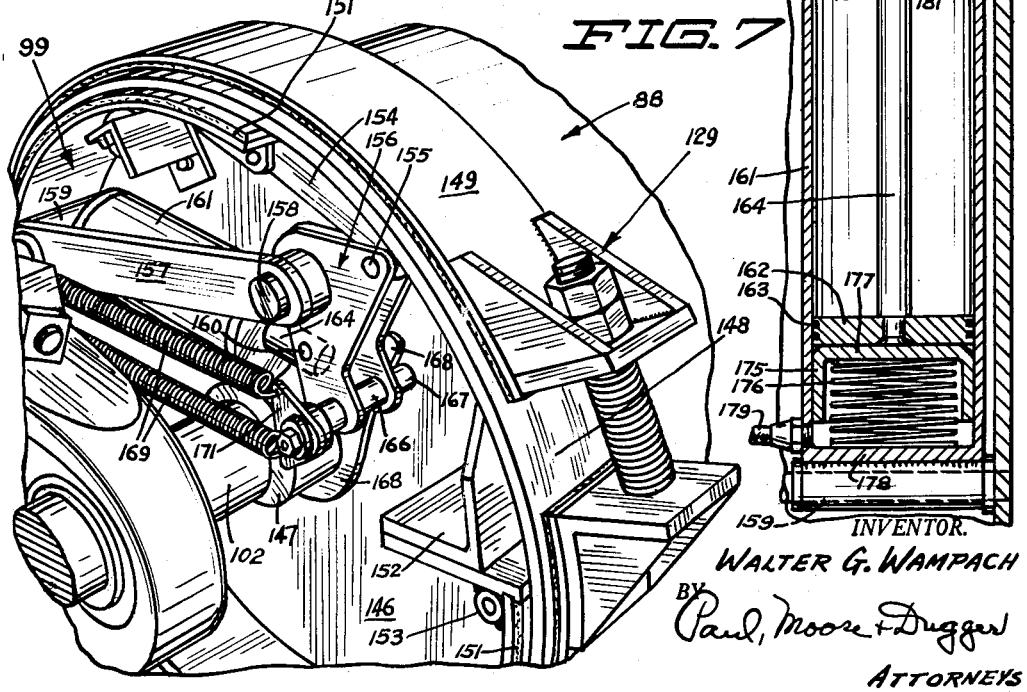
INVENTOR.
WALTER G. WAMPACH
BY Paul, Moore + Dugger
ATTORNEYS

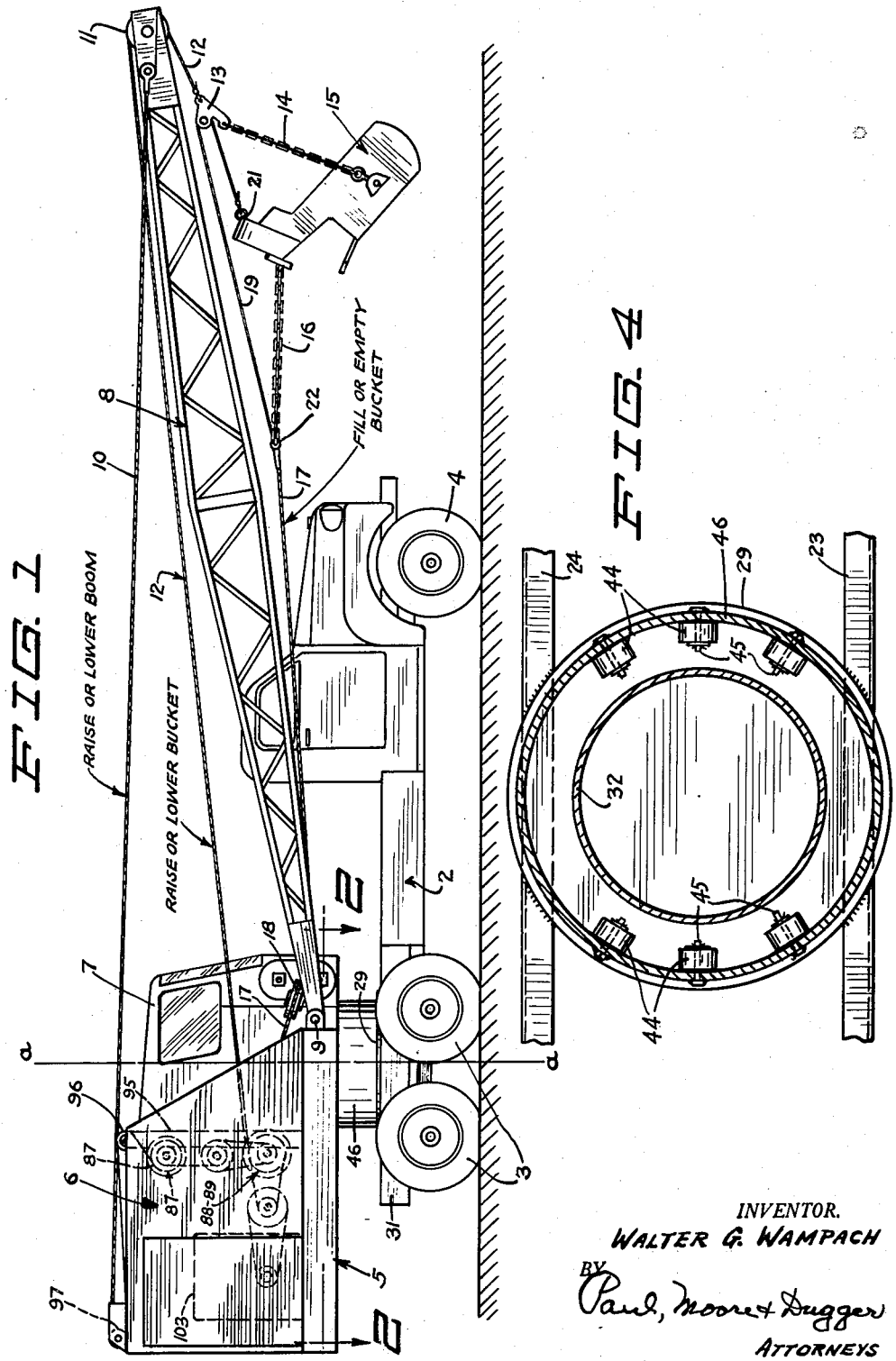

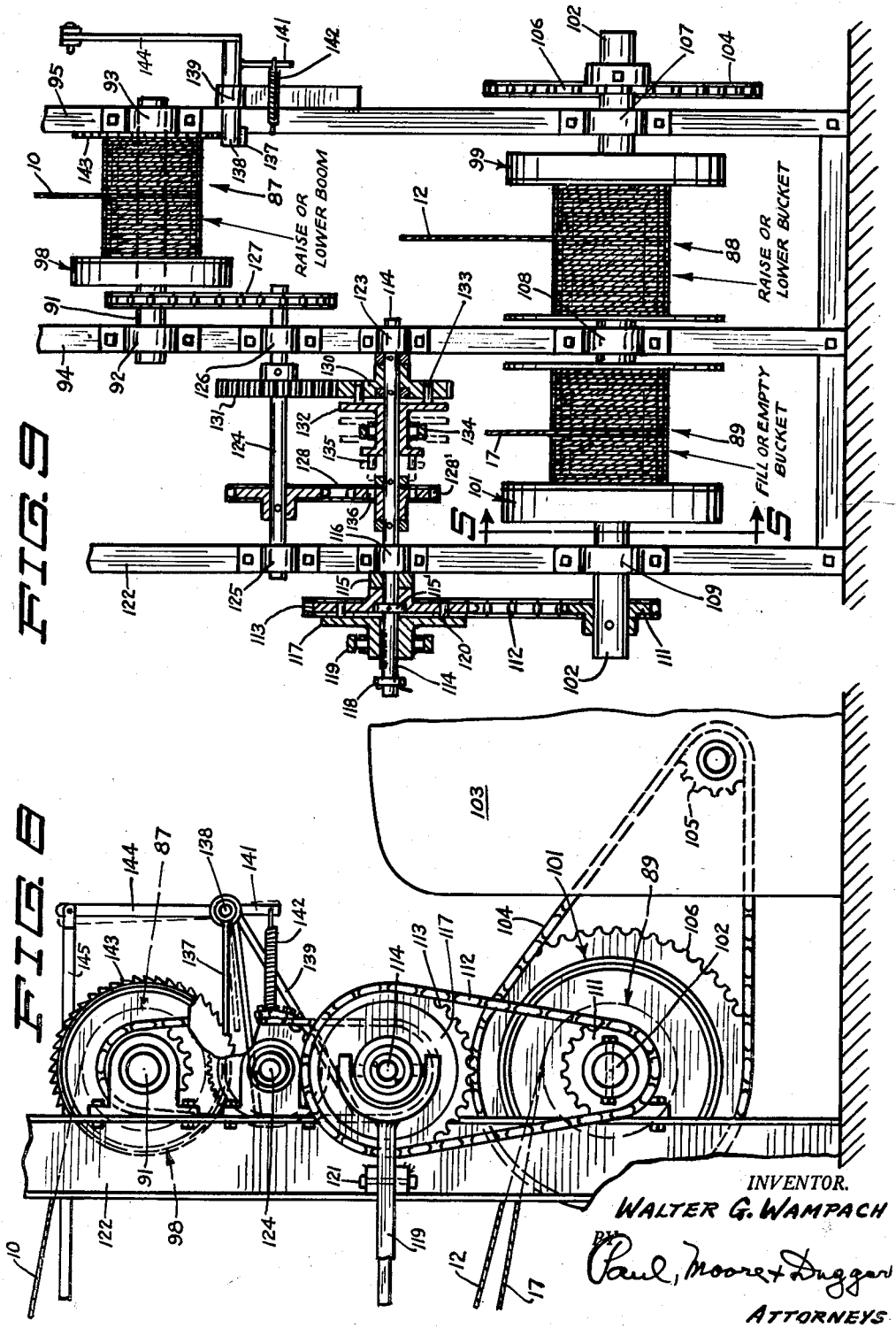

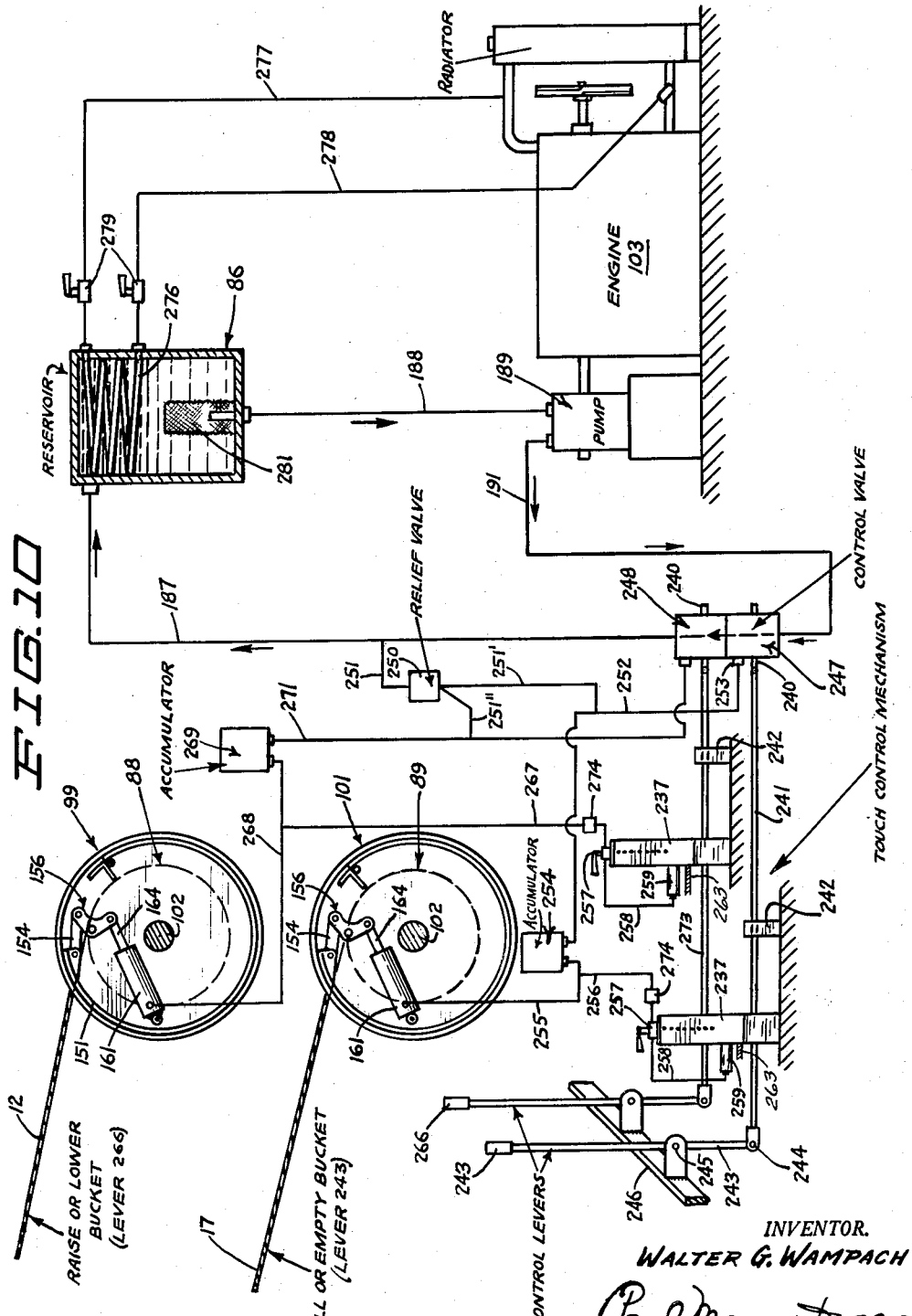

Jan. 3, 1961 W. G. WAMPACH 2,966,752
CRANES
Filed Sept. 6, 1955 7 Sheets-Sheet 6
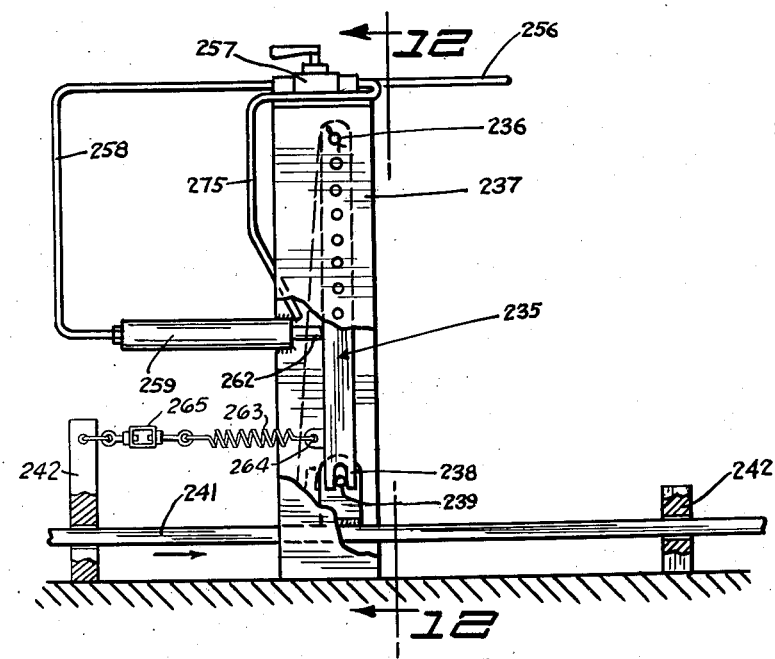
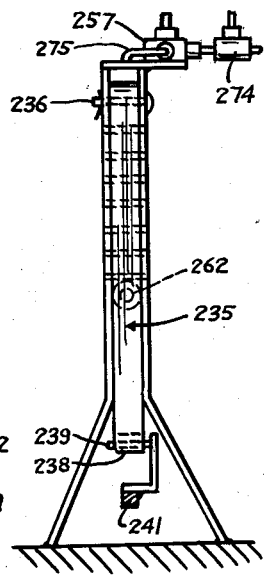
INVENTOR.
WALTER G. WAMPACH
ATTORNEYS

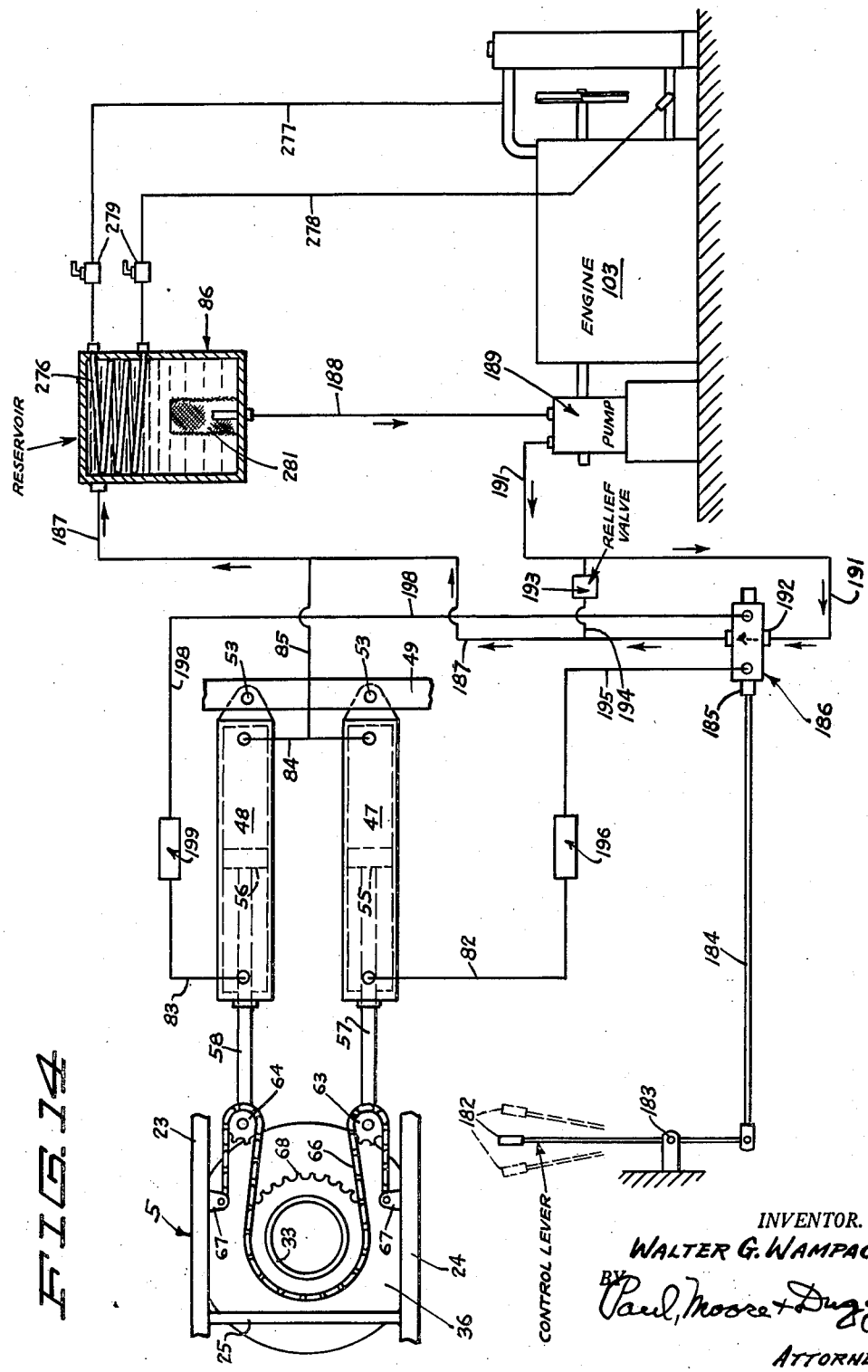

2,966,752

CRANES

Walter G. Wampach, Minneapolis, Minn.

Filed Sept. 6, 1955, Ser. No. 532,473

3 Claims. (Cl. 37—116)

This invention relates to new and useful improvements in cranes generally, and particularly to the type commonly used for operating a drag line bucket.

Cranes are now extensively used for excavating and moving dirt and in the operation of lifting heavy equipment, such as machinery, steel, iron, etc. They usually comprise a swing bed mounted upon a power-propelled vehicle such as a truck of the wheeled or endless tracktype, whereby the apparatus may be moved about from place to place. Cranes designed for heavy duty work are of necessity extremely heavy and, as a result, are often barred from traveling on state or trunk highways because of the possible damage they may cause to the pavement or road surfacing. As such apparatus must frequently be moved from one job to another, it is of utmost importance that the over-all weight of the apparatus be reduced sufficiently to permit such apparatus to be moved over municipal and rural streets and highways, if possible, and it is an object of the present invention to provide a crane or excavator which, while comparatively light in overall weight, is capable of performing heavy duty work in a very efficient manner.

A further object of the invention is to provide a hydraulic crane comprising a swing bed or platform mounted upon a suitable propelling vehicle, and adapted for swinging movement thereon about a vertical axis, said swing bed or platform carrying at one end an elongated boom, the outer end of which may be vertically raised or lowered by a suitable cable having a running connection with the boom and a winding mechanism provided on the swing bed; the pivotal connections of the boom with the swing bed being so located with respect to the vertical axis about which the swing bed rotates, whereby it is possible to lift extremely heavy loads with a boom of relatively light construction, whereby the boom may readily be maneuvered about by the operator to quickly locate the drag line bucket in position to pick a load, and also whereby the boom and bucket may readily and quickly be maneuvered into position to dump its load into a truck or other receiving means.

A further object of the invention resides in the novel construction of the means for horizontally swinging the boom in the operation of placing or spotting the bucket in a predetermined position to pick a load, such means comprising a hydraulically operated mechanism including a pair of spaced parallel cylinders each having a ram operable therein, and said rams carrying at their outer ends a pair of sprockets having running connections with a chain, the ends of which are fixedly anchored to the swing bed, and the intermediate portion of the chain having a running connection with an enlarged sprocket secured to a stationary hub mounted on the propelling vehicle, the chain being so threaded around the enlarged stationary sprocket and the smaller sprockets secured to the ends of the rams of the two cylinders, whereby the swinging movement of the swing bed and boom may be accomplished with a minimum movement of the rams, thereby making it possible to quickly horizontally swing the boom from one place to another, the unique arrangement of the rams, sprockets and chain also making it possible to relatively shorten the length of the swing bed, resulting in a more compact structure.

A further object resides in the novel construction of the means for pivotally mounting the swing bed and boom on the propelling vehicle, whereby friction is reduced to a minimum with a resultant decrease in the power required to horizontally swing the boom and bucket into position to pick a load, or to discharge a load from the bucket.

A further object is to provide a boom and bucket operating mechanism comprising a plurality of cable winding drums for raising and lowering the boom and for maneuvering the bucket into position to pick a load, said operating mechanism being arranged to raise or lower boom under power, whereby the operator may readily control the downward movement of the boom to accurately maneuver a heavily loaded bucket into position over a truck body to discharge its load thereinto without danger of damaging the truck body.

A further object resides in the novel construction of the mechanism used for controlling the swinging movement of the boom, such mechanism being so constructed that the boom is under positive control of the operator at all times, thereby enabling the operator to maneuver the boom into its various working positions with a smooth quick action, and without "drifting" as a result of side winds, or as when operating on an incline or side hill.

A further object resides in the unique construction of the cylinders and pistons utilized for operating the hoist and drag line cables, the piston of each cylinder comprising a floating, self-sealing cup-shaped packing which positively prevents leakage of the fluid from the clutch cylinders when the apparatus is in operation.

A further object of the invention resides in the construction of the control mechanism for controlling the flow of pressure fluid to and from the clutch cylinders, whereby when one of the operating levers is manipulated to cause actuation of its complemental clutch, the pressure developed in the clutch cylinder will be commensurate with that required for each given job, thereby assuring operation of the clutch without grabbing, even when the clutch control levers are manipulated by an unskilled operator, said control mechanism imparting to the control levers a certain "feel" which constantly apprises the operator of the pressure required in the clutch cylinders for each given job, whereby the clutch operating levers may be readily and accurately manipulated by the operator to gradually ease the bucket into position to pick its load or to discharge a load therefrom.

A further and more specific object of the invention resides in the construction of the means for imparting a certain "feel" to the clutch operating levers, which may well be termed a "touch control," which is highly desirable in that it enables the operator to readily manipulate the control levers to cause the clutches to function smoothly and without grabbing, as the operator can, when grasping the clutch control levers, "feel" just how said levers should be actuated to cause the clutches to do the job at hand.

Other objects of the invention reside in the novel construction of the hydraulically operated chain-and-sprocket mechanism for effecting horizontal swinging movement of the swing bed and boom, and whereby the boom may readily and quickly be laterally swung from one place to another during operation of the machine, without "jerking," and in a comparatively short interval of time; in the novel means provided for maintaining the operating chain of the swing bed under constant working tension; in the unique construction of the mechanism for raising or lowering the boom and whereby the boom may readily be raised or lowered under power; and in the means provided for imparting a certain "feel" or touch to the control levers, whereby the operator may readily manipulate said levers to cause the clutches to function with a pressure commensurate with that required for each given job, and whereby the clutches cannot "grab," and impart a jerky motion to the boom.

These and other objects of the invention and the means for their attainment will be more apparent from the following description, taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a side elevational view of a conventional crane showing the invention embodied therein;

Figure 2 is an enlarged detail sectional plan view taken on the line 2—2 of Figure 1, showing the swing bed and the hydraulic operating means for relatively rotating the swing bed on the supporting vehicle;

Figure 3 is a longitudinal sectional view on the line 3—3 of Figure 2;

Figure 4 is a detail sectional plan view on the line 4—4 of Figure 3, showing the hook rollers for preventing the swing bed from relatively tilting on the supporting vehicle;

Figure 5 is an enlarged detail sectional view on the line 5—5 of Figure 9, showing the clutch operating means;

Figure 6 is a perspective view showing the clutch linkage;

Figure 7 is an enlarged detail sectional view on the line 7—7 of Figure 5, showing the construction of the pistons located within the clutch cylinders;

Figure 8 is an enlarged side elevation of the cable winding mechanism;

Figure 9 is a rear view of Figure 8, showing the three cable winding drums and the drive means therefor;

Figure 10 is a view schematically illustrating the fluid connections between the engine operated fluid pump and the clutch cylinders, and also showing the manually operable control levers for controlling the flow of fluid to and from the clutch cylinders during operation of the crane;

Figure 11 is an enlarged detail view of the touch control mechanism, showing the parts in neutral position;

Figure 12 is a vertical sectional view on the line 12—12 of Figure 11;

Figure 13 is a plan view of Figure 11; and

Figure 14 is a view schematically illustrating the means for manually directing the pressure fluid to and from the cylinders for rotatably swinging the swing bed.

*Boom supporting structure*

(Figures 1, 2, 3 and 4)

In the selective embodiment of the invention herein disclosed, there is illustrated in Figure 1, for purposes of disclosure, a conventional crane or excavator comprising a propelling vehicle or truck 2 having tandem drive wheels 3, front wheels 4, and a swing bed 5, shown mounted for rotation about a vertical axis a—a on the truck 2. A house 6 is mounted on the swing bed 5 for housing the various operating mechanisms of the apparatus. The house 6 has a cab 7 at its forward end for an operator, as is well known.

A boom 8 is pivotally mounted at 9 to the forward end of the swing bed 5. A cable 10 is connected to the outer end of the boom and extends rearwardly therefrom into engagement with a suitable winding mechanism, subsequently to be described. A sheave 11 is provided at the outer end of the boom and has a hoisting cable 12 operatively engaged therewith. One end of cable 12 is secured to a fitting 13, having the chains 14 of a drag line bucket 15 secured thereto. Similar chains 16 are secured to the forward end of the bucket 15 and are connected to a drag line or cable 17, which also extends rearwardly and has running engagement with a fairlead 18 of conventional construction, and to a suitable winding mechanism provided in the house 6. A short length of cable 19 has one end secured to the forward end of the drag line bucket 15, as indicated at 21, and the other end of said cable is connected to the drag line cable 17 at the junction between said cable and chains 16, indicated at 22 in Figure 1.

*Swing bed and supporting means therefor*

(Figures 1, 2, 3 and 4)

An important feature of the present invention resides in the novel construction of the swing bed and its supporting means. As best illustrated in Figures 1 and 2, the swing bed comprises side frame members 23 and 24 and suitable cross members 25 and 26 provided at the front and rear ends of the swing bed, respectively, as illustrated in Figure 2.

In Figure 3, there is indicated a swing bed supporting frame, generally designated by the numeral 27, shown comprising upper and lower circular plates 28 and 29, respectively, permanently mounted upon the truck frame 31, a portion of which is shown in Figures 1 and 3. A cylindrical wall member 32 has its upper and lower ends respectively secured to the plates 28 and 29. The cylindrical member 32 is relatively smaller in diameter than the diameter of plates 28 and 29, whereby the projecting marginal edge portions of said plates, particularly plate 28, may function as a track, as will subsequently be described.

An upright cylindrical hub 33 is welded to the upper face of plate 28 and is axially aligned with plate 28 and the cylindrical wall member 32, as clearly indicated in Figure 3. Thus, the hub 33, plates 28 and 29, and cylindrical member 32, are welded together to provide an integral composite structure for supporting the swing bed 5 and its various mechanisms carried thereon. Plate 29 is fixedly secured to the frame member 31 of the supporting vehicle or truck 2.

The swing bed 5 is mounted for relative rotation on the truck frame 2 about the vertical axis a—a, and is rotatably supported on the hub 33 by a plurality of anti-friction rollers 34, retained in rolling contact with the periphery of hub 33 by an annular member 35 secured to a plate 36 by such means as bolts or screws 37. Top and bottom guide plates 38 and 39 are secured to members 35 and 36 and extend inwardly therefrom, and overlie the ends of rollers 34, thereby to retain them in rolling contact with the hub 33 and the bore provided in the contiguous members 35 and 36, as will be clearly understood by reference to Figures 2 and 3. An annular dust shield 40 is secured to the hub 33 and extends outwardly therefrom over the rollers 34, as shown in Figure 3. Dust shield 40 cooperates with an annular packing 40' to prevent dirt and other foreign matter from entering the anti-friction rollers 34.

The weight of the swing bed is carried directly upon the plate 28 of the truck frame 2 by suitable anti-friction rollers 41, shown rotatably mounted on radial supporting pins or rods 42. The inner ends of rods 42 are secured to an annular retaining member 43, as will be understood by reference to Figures 2 and 3. Rollers 41 are interposed between plate elements 28 and 36, plate 36 being secured to the frame members 23, 24 and 25 of the swing bed 5, whereby plate 36 becomes in effect an integral part of the swing bed and rotates directly therewith.

To prevent the swing bed from relatively tilting upon the truck frame 2, a plurality of hook rollers 44 are rotatably mounted on short shafts 45 secured to an annular member 46 having its upper edge suitably fixed to the plate 36 by such means as welding. Rollers 44 are located fore-and-aft of the vertical axis a—a about which the swing bed rotates, and engage the bottom surface of plate 28. Thus, rollers 44 cooperate with rollers 41 to support the swing bed upon the truck frame, whereby it is freely rotatable thereon. Means, not shown, is provided for adjustably securing the roller pins 45 to the annular member 46, whereby said pins may be vertically adjusted upon member 46 to eliminate vertical play of the marginal edge of plate 28 between rollers 41 and 44, as will be understood by reference to Figure 3.

*Swing bed operating means*

(Figures 2, 3 and 14)

The swing bed operating means constitutes another important feature of the present invention. It is shown comprising a pair of spaced cylinders 47 and 48 mounted between the side members 23 and 24 of the swing bed 5 and having their rear ends pivotally connected to a pair of vertically spaced parallel bars 49, shown welded to the cross member 26 of the swing bed, thereby to receive the mounted lugs 51 and 52 of the cylinders 47 and 48, respectively. The cylinder lugs 51 and 52 are pivotally connected to bars 49 by suitable pivot pins 53, whereby the forward or opposite ends of the cylinders are free to laterally oscillate for reasons subsequently to be described. The forward ends of cylinders 47 and 48 are supported by a cross member 54 having its ends suitably welded to the side frame members 23 and 24 of the swing bed 5, as will be understood by reference to Figure 2.

Pistons 55 and 56 are reciprocally mounted in cylinders 47 and 48, and have piston rods or rams 57 and 58, respectively, secured thereto. The piston rods 57 and 58 are slidably supported in suitable guide openings provided in cylinder heads 59. Spaced plates 61 and 62 are secured to the ends of piston rods 57 and 58 and have mounted therebetween a pair of idler sprockets 63 and 64, by suitable pivot pins 65. The end portions of a sprocket chain 66 have running connections with the idler sprockets 63 and 64, and have their terminals anchored to the side frame members 23 and 24 of the swing bed by such means as brackets 67, best shown in Figure 2. The intermediate portion of chain 66 is operatively engaged with an enlarged sprocket 68, shown secured to the upper end portion of hub 33 by such means as welding, whereby sprocket 68 becomes, in effect, an integral part of the composite structure comprising plates 28 and 29, and the cylindrical members 32 and 33.

Means is provided for maintaining the sprocket chain 66 at the proper operating tension at all times, and is shown comprising a tension device, generally deignated by the numeral 69 (see Figures 2 and 3). This tension device comprises a cable 71 having its ends suitably secured to lugs 72 welded to the lower plates 62 of the piston rods 57 and 58. The opposite end of cable 71 has a running connection with a sheave 73 rotatably supported in a clevis 74 by a pin 75. Clevis 74 is secured to one end of a threaded rod 76, the opposite end of which is threadedly engaged with one end of a turnbuckle 77. A similar rod 78 is received in threaded engagement with the opposite end of the turnbuckle and is connected to the cross member 26 by a pivot 79, shown in Figure 3.

The turnbuckle 77 provides means for tensioning cable 71, whereby it constantly exerts a pull on the chain 66 to take up all slack therein. If desired, a tension spring might be substituted for the turnbuckle 77, whereby the cable 71 would be under constant tension to take up slack in the chain 66. The clevis 74 in which the idler sheave 73 is mounted, is shown provided with a looped strap-like supporting member 81 having its ends secured to clevis 74, as best shown in Figure 3. Cross member 54 passes through member 81, whereby the weight of clevis 74 and sheave 73 are carried by the cross member 54.

Suitable conduits 82 and 83 are shown in communication with the forward ends of cylinders 47 and 48 for delivering a pressure fluid thereto, as will subsequently be described. The opposite or rear ends of the cylinders are shown interconnected by a cross conduit 84 having a T-fitting therein for connecting conduit 84 to one end of a conduit 85, the opposite end of which is in communication with a suitable fluid supply reservoir 86, as indicated in Figure 14.

*Cable winding mechanism*

(Figures 8 and 9)

The cable winding mechanism is best illustrated in Figures 8 and 9, and comprises three drums designated by the numerals 87, 88 and 89. Drum 87 is secured to a shaft 91, shown mounted in suitable bearings 92 and 93 secured to upright frame members 94 and 95 within the house 6 of the crane. Boom cable 10, shown in Figure 1, is coiled about drum 87 and is threaded around idler sheaves 96 and 97. In Figure 1, the boom lifting cable 10 is shown comprising but a single cable, but it is to be understood that in actual use, a plurality of cables may be utilized in the form of a conventional block-and-tackle to obtain the necessary power to lift the boom, when the bucket 15 is loaded.

Hoist cable 12, which raises and lowers the bucket on the boom, extends forwardly from the winding mechanism and is threaded around idler sheave 11 at the outer end of the boom and has one end secured to fitting 13 of the bucket, as hereinbefore stated. The bucket or drag line cable 17 extends rearwardly from the draft chains 16 of the bucket to the winding drum 89. Drums 88 and 89 are driven respectively by clutches 99 and 101 from a main drive shaft 102. Drive shaft 102 is shown driven from an engine 103 by a suitable chain 104, having running connections with the engine drive sprocket 105, and a driven sprocket 106, secured to the main drive shaft 102. Thus, whenever the engine 103 is operating, shaft 102 is rotating. Main drive shaft 102 is rotatably supported in bearings 107, 108 and 109.

Secured to the opposite end of drive shaft 102 is a sprocket 111 having a chain 112 operatively connecting it to a sprocket 113, normally freely rotatable on a counter shaft 114. A collar 115 is shown interposed between a bearing 116 and the adjacent end of the hub of sprocket 113, thereby to prevent axial movement of sprocket 113 in a direction towards bearing 116, when viewed as shown in Figure 9. A second collar 115' is secured to shaft 114 at the opposite side of sprocket 113, thereby to retain sprocket 113 in alignment with drive sprocket 111 on shaft 102.

A clutch disc 117 is slidably mounted on the outer end of shaft 114 between sprocket 113 and a collar 118, fixed to shaft 114. A forked operating lever 119, shown pivoted at 121 to the machine frame, is operatively engaged with the hub of clutch disc 117 to provide means for shifting the clutch disc into and out of driving engagement with sprocket 113. Clutch disc 117 is shown provided with a plurality of clutch pins 120 receivable in suitable apertures in sprocket 113, thereby to effect a driving connection between sprocket 113 and shaft 114. It is to be understood that clutch disc 117 is splined to shaft 114, whereby it rotates synchronously therewith.

Bearings 109 and 116 are secured to an upright frame member 122, and the opposite end of counter shaft 114 is supported in a bearing 123 secured to upright 94. A second counter shaft 124 is rotatably mounted in bearings 125 and 126 over shaft 114, and has a chain drive 127 operatively connecting it to shaft 91 of the boom drum 87. Thus, shaft 114 rotates simultaneously with shaft 102 when clutch disc 117 is engaged with clutch sprocket 113, as will be understood by reference to Figure 9.

Another important feature of the present invention resides in the means provided for driving the boom drum 87, whereby the outer end of the boom 8 may be lowered, under power, if deemed advisable. In cranes of this general type, as now commonly constructed, the downward movement or lowering of the boom is usually controlled by a conventional brake, generally designated by the numeral 129 in Figure 6. Brake 129 is adapted to be actuated by a suitable foot pedal, not shown in the drawings. Such control of the downward movement of the boom has proven satisfactory when handling light or normal loads.

However, when handling extremely heavy loads, such as shop machinery or equipment, particularly when loading such equipment into a truck, or placing it in a given location, extreme care must be exercised by the operator to avoid damaging the truck, should the operator momentarily lose control of the load, as a result of clutch slippage, allowing the load to drop by gravity into the truck. To avoid momentarily losing control of the load, the present invention embodies means whereby the unwinding of the boom lifting cable 10 from drum 87 may be controlled by power, when deemed necessary, thereby enabling the operator to gradually ease a heavy load into position in a truck without any danger whatsoever of the load momentarily getting away from him.

The means provided for thus controlling the downward movement of the boom by power, is best shown in Figure 9, and comprises a pair of spur gears 130 and 131, mounted respectively on counter shafts 114 and 124. Gear 130 is normally freely rotatable on shaft 114, whereas gear 131 is fixedly secured to shaft 124 for direct rotation therewith. A clutch member 132 is slidably, but non-rotatably mounted on a counter shaft 114 adjacent to spur gear 130, and has a plurality of clutch pins 133 adapted for clutching engagement with sockets provided in spur gear 130. A forked clutch operating arm 134, similar to clutch actuating arm 119, is operatively engaged with clutch disc 132 to provide means whereby said clutch disc may be axially shifted on shaft 114 from clutching engagement with spur gear 130, to its neutral position between gear 130 and sprocket 128' of chain drive 128. Clutch member 132 is provided at its opposite end with clutch pins 135 adapted for clutching engagement with sockets 136, provided in sprocket 128'.

When the boom is to be raised, clutch disc 117 is engaged with sprocket 113, as shown in Figure 9, whereby shaft 124 is driven from shaft 114 through chain drive 128 in a direction to wind cable 10 onto drum 87. To lower the boom under normal operating conditions, clutch disc 117 is disengaged from sprocket 113 by manipulation of lever 119, shown in Figure 8, thereby freeing drum 87 from the power source. When clutch 117 is thus disengaged from sprocket 113, the weight of the load and boom will tend to unwind cable 10 from drum 87. Such unwinding of cable 10 is controlled by the operator by manipulation of a conventional brake, such as indicated by the numeral 129 in Figure 6.

Means is also provided for locking the boom cable winding drum 87 against unwinding cable 10, should the driving connection between said drum and counter shaft 114 for some reason be interrupted. Such means is shown comprising a safety latch 137 secured to a shaft 138 mounted in a suitable bracket 139, as indicated in Figures 8 and 9. Shaft 138 has a depending arm 141 to which one end of a suitable spring 142 is secured, the opposite end of which is secured to the frame member 95, whereby spring 142 constantly urges the latch 137 into locking engagement with a ratchet wheel 143, secured to one end of drum 87, as indicated in Figure 9. Shaft 138 has a lever 144 secured thereto, to the upper end of which one end of an operating rod 145 is secured. Rod 145 extends forwardly in a direction towards the operator's cab 7, whereby the operator may conveniently manipulate latch 137 to permit reverse rotation of drum 87, when it is desired to lower the boom.

*Friction clutches*

(Figures 5, 6 and 7)

Another feature of the invention resides in the novel construction of the clutches utilized for driving drums 88 and 89, during operation of the crane. Two such clutches are required, one for each of drums 88 and 89, and are herein identified by the reference characters 99 and 101. As these clutches are identical in construction and operation, but one will be described in detail as, for example, clutch 99 of drum 88 which actuates the hoist cable 12.

As best illustrated in Figures 5, 6 and 7, clutch 99 comprises a circular end plate 146 having a hub 147 affixed thereto and bored to receive shaft 102 on which winding drum 88 is rotatably mounted.

In Figure 9, 88 designates the drum upon which the boom cable 12 is wound. This drum is provided at each end with an outwardly turned radial flange, one of which has a cylindrical clutch and brake drum 148 secured thereto. The inner surface of drum 148 constitutes a part of clutch 99, and the outer cylindrical surface thereof serves as a brake drum for a brake band 149 of friction brake 129. Brake band 149 has one end anchored to a fixed support, not shown, and is provided with means for contracting the band to frictionally grip drum 148 to retard or interrupt rotation of drum 88, as will be understood. Clutches 99 and 101 are provided with similar brake bands 149, which are operable by suitable foot pedals, not shown in the drawings, to retard rotation of drums 88 and 89, when paying out the cables wound thereon, when operating bucket 15. The brakes above referred to are well known in the art, and, therefore, need not be further described.

Mounted on the circular clutch plate 146 is a clutch band 151 having one end pivotally secured to a bracket 152 fixed to the circular plate 146 by such means as welding. The pivotal connection between the clutch band 151 and bracket 152 is clearly indicated at 153. The opposite end of clutch band 151 has one end of a link 154 pivoted thereto, the opposite end of which is pivoted at 155 to one end of a bell crank, generally designated by the numeral 156. A supporting arm 157 has one end pivoted to bell crank 156, as shown at 158. The opposite end of arm 157 is mounted on a pivot 159 secured to and extending outwardly from the circular clutch plate 146.

A cylinder 161 has one end pivotally mounted on the pivot or stud 159 and has a piston 162 mounted for reciprocal movement therein, as best illustrated in Figure 7. Suitable O-rings 163 may be mounted in the periphery of piston 162 to prevent leakage of the pressure fluid therearound. Piston 162 has a piston rod 164 which extends through the head 165 of cylinder 161 and is pivotally connected to the dual bell cranks 156, as best illustrated at 160 in Figure 6.

Mounted in suitable apertures provided in the dual bell cranks 156 is a stud 166, the ends of which extend well beyond the adjacent surfaces of their respective bell cranks, as illustrated in Figure 6. The end portion 167 of stud 166 is positioned to engage a stop member 168 having one end suitably secured to the hub 147 by such means as welding, indicated in Figure 5. Stop member 168 functions to prevent the piston 162 in cylinder 161 from receding into the cylinder beyond a predetermined distance, for reasons subsequently to be described.

Suitable tension springs 169 are operatively connected to one end of stud 166 by such means as a rocker or equalizer 171. The opposite ends of springs 169 are connected to a cross member 172 adjustably mounted on a rod 173. The opposite end of rod 173 is supported on a bracket 174 shown fixed to the pivot 159. Springs 169 constantly urge piston rod 164 into its retracted position in cylinder 161, as shown in Figure 7.

Another feature of the present invention resides in the construction of the floating cup-shaped packing or piston-like member 175 in cylinder 161. This cup-shaped member is made from a suitable flexible material such as neoprene, which is highly resistant to moisture, oil and chemicals. A spring 176 is inserted into the cup-shaped packing or piston-like member 175, and has one end seated against the end wall 177 thereof, and its opposite end against the end wall 178 of cylinder 161.

Stop member 168 is so positioned with reference to pivot pin 166, that when the ram or piston rod 164 is retracted, as shown in Figure 7, pin 166 engages stop member 168 and thus prevents the bottom edge of packing 175, when viewed as shown in Figure 7, from engaging cylinder head 178 of piston 161, whereby the pressure fluid may flow freely into or out of the cylinder from conduit 179, as will subsequently be described. Cylinder head 165 has a vent hole 181 for venting the interior of cylinder 161, when the ram 164 is reciprocated therein to actuate the clutch.

Cranes of the general character herein disclosed are usually operated by a plurality of hand levers and foot pedals. One hand lever controls the operation of rams 57 and 58 to effect horizontal or lateral swinging movement of the boom (Figures 2 and 14); a second lever controls the operation of drum 87 and cable 10 to raise or lower the boom (Figures 8 and 9); a third lever controls operation of drum 88 and cable 12 to raise or lower the bucket on the boom (Figure 10); and a fourth lever controls operation of drum 89 and drag line cable 17 for loading and unloading the bucket 15 (Figure 10). The usual brake pedals for controlling the unwinding of cables 10, 12 and 17 from their respective drums 87, 88 and 89, are also provided, but as hereinbefore stated these are common and well known in the art, and have therefore been omitted from the drawings.

As hereinbefore described, the swing bed 5 is relatively rotatable on the trunk frame 2, shown in Figure 1, and such swinging movement of the swing bed and the boom 8 is accomplished by the manipulation of a manually operable control lever generally designated by the numeral 182. Lever 182 is pivoted to a fixed support, indicated at 183 in Figure 14, and has its lower end operatively connected to one end of a connecting rod 184, the opposite end of which is connected to the plunger 185 of a conventional four-way valve, generally designated by the numeral 186.

The four-way valve 186 has a conduit 187 connecting it to the upper portion of the fluid supply reservoir 86. A conduit 188 is in communication with the reservoir 86 and leads to the pressure pump 189 adapted to be driven by the power unit or engine 103 of the apparatus to operate the swing mechanism, shown in Figures 2, 3 and 14. Pump 189 has an outlet conduit 191 connecting it to the intake 192 of the four-way valve 186, whereby the pressure fluid is constantly circulated through valve 186, when the engine 103 is operating, and control lever 182 is in neutral position, as shown in full lines in Figure 14. A relief valve, generally designated by the numeral 193, is provided in a by-pass 194, interposed between conduits 187 and 191 for returning the pressure fluid directly to the reservoir 86, via by-pass 194 and return conduit 187, should an abnormal pressure develop in the fluid control system, during operation of the apparatus. It is to be understood that valve 186 is normally open to the free flow of fluid therethrough, when in neutral position. Control valve 186 and relief valve 193 are of well known construction, and, therefore, need not be described in detail.

Valve 186 has a conduit 195 connecting it to conduit 82 through a fitting 196 shown in Figure 14. The opposite end of fitting 196 is connected by conduit 82 to the pressure end of cylinder 47. The opposite end of the four-way control valve 186 has a conduit 198 connecting it to one end of a similar fitting 199, the opposite end of which is in communication with conduit 83 of cylinder 48.

Touch control
(Figures 10, 11, 12 and 13)

Another important feature of the present invention resides in the means provided in conjunction with certain of the control levers for imparting to such levers what might well be termed a "finger touch control," whereby the operator may at all times during operation of the hoist and drag cables 12 and 17, "feel" with his finger tips the amount of pressure required on the control levers to cause the various operating mechanisms to function to load or unload the bucket.

The touch control herein disclosed is fluid operated and functions automatically to direct a portion of the pressure fluid against said levers, when the operator attempts to swing the levers in a direction to cause the clutch mechanisms associated therewith to function. The touch control mechanism is best illustrated in Figures 10, 11, 12 and 13, and comprises a movable element 235 shown pivoted at 236 to a suitable support 237. The lower end of element 235 is shown forked as indicated at 238, which forked end engages a pin 239 secured to an operating rod 241, having one end slidably mounted in a guide 242. The opposite end of rod 241 is pivotally connected to the lower end of an operating lever 243, as indicated at 244 in Figure 10. Lever 243 is pivoted at 245 to a fixed support, generally designated by the numeral 246. The opposite end of rod 241 is operatively connected to a valve element 240, slidably mounted in and forming a part of a suitable fluid control valve 247, of conventional construction. Valve 247, therefore, need not be further shown and described in detail.

Valve 247 is shown mounted adjacent to a similar valve 248, with which it is in direct communication, as is well known. Valves 247 and 248 are connected to pump 189 by conduit 191, as shown in Figure 10.

To complete the fluid control circuit to the finger touch control mechanism, valve 247 has a conduit 252 conconnecting it to the intake side of an accumulator or cushion element 254, the other side of which is connected by conduit 255 to the pressure end of cylinder 161 of clutch 101 of winding drum 89, as schematically illustrated in Figure 10.

Leading from conduit 255 is a conduit 256, which is connected to one end of a shut-off valve 257, the opposite end of which has one end of a conduit 258 connecting it to one end of a cylinder 259, having a plunger 261 mounted for reciprocal movement therein. The end 262 of plunger 261 projects from the opposite end of cylinder 259 and engages pivoted element 235, as best illustrated in Figure 11. A suitable spring 263 has one end attached to the pivoted element 235, as indicated at 264, and its opposite end is secured to one end of a turnbuckle, generally designated by the numeral 265, the opposite end of turnbuckle 265 being shown anchored to the support 242.

The touch control feature is preferably applied to the control levers which control the operations of drums 88 and 89 for controlling the operation of cables 12 and 17, to vertically hoist the bucket and to maneuver the bucket into position to pick a load, or to dump a load. As illustrated in Figure 10, lever 243 controls the operation of clutch 101 of the bucket loading cable 17, and control lever 266 controls the operation of clutch 99 of the boom hoisting cable 12. As the touch control mechanisms of clutches 99 and 101 are identical in construction, like parts thereof will be referred to by like numerals.

Shut-off valve 257 of control lever 266 has a conduit 267 connecting it to a conduit 268 leading from cylinder 161 of clutch 99 to an accumulator or cushion member 269, similar to accumulator 254. A conduit 271 connects cushion member 269 to the discharge side of control valve 248, whereby when said valve is opened by manipulation of control lever 266 through connection 273, clutch 99 is actuated to wind up cable 12.

A pressure relief valve 250 is interposed in a by-pass 251 having branch connections 251' and 251" with conduits 252 and 271, respectively, for by-passing the pressure fluid back to the reservoir, should an abnormal pressure develop in conduits 252 or 271 during operation of the apparatus.

Shut-off valves 274 are provided in conduits 256 and 267 leading to valves 257 of the two clutch control mechanisms, whereby the touch control mechanisms may be completely shut off from the pressure fluid, when so desired. When the touch control mechanism is operatively connected in the system by opening valves 274 and 257, a portion of the fluid flowing to cylinders 161 will pass through conduits 256 and 258 to valves 257. From these valves the pressure fluid passes through conduits 258 to cylinders 259, whereupon the plungers 261 therein are thrust forwardly and thus exert a pressure against the pivoted elements 235. Such pressure is transmitted to the upper ends of operating levers 243 and 266, and tends to move them in a direction to actuate clutches 99 and 101. When valves 274 and 257 are opened, a portion of the fluid will pass through short conduits 275 onto the exposed end portions 262 of plungers 261, thereby to automatically lubricate said plungers (see Figures 11 and 13).

To enable the apparatus to be operated in freezing temperatures, means may be provided for maintaining the pressure fluid in reservoir 86 at a free-flowing temperature. Such means is indicated in Figures 10 and 14, and may comprises a coil 276 located within the reservoir 86, and having fluid circulating connections 277 and 278 connecting it to the usual fluid cooling system of the engine 103. Shut-off valves 279 are shown provided in connections 277 and 278, whereby circulation of the engine cooling fluid through coil 276 may be interrupted in warm temperatures. A suitable filter 281 may be provided in the reservoir for preventing foreign matter from entering the suction conduit 188 leading to pump 189.

The fluid pressure exerted on control levers 243 and 266 by the touch control mechanism herein disclosed is of extreme importance. By changing the tension in springs 263 by manipulation of turnbuckles 265, it may be varied to impart to the operators hands, the desired "feel," which makes it possible for the operator, at all times, to easily and accurately control the movements of the bucket at a speed commensurate with the class of work being performed, without fatigue, and without subjecting the operating parts to shocks and jerks. The touch control also enables the operator to gradually ease a heavy load suspended from the boom, such as a piece of machinery, into a given position on a fixed area, as, for example, a foundation.

Operation

In the operation of the crane herein disclosed, the boom 8 is swung from its normal inoperative position, shown in Figure 1, to its operating position at the opposite end of the supporting truck. Such swinging movement of the boom is accomplished by manipulation of lever 182, shown in Figure 14, which actuates the four-way control valve 186. This valve, as hereinbefore stated, controls the flow of the pressure fluid to and from cylinders 47 or 48, to effect the desired swinging movement of the boom. It is to be understood that rams 57 and 58 of cylinders 47 and 48, respectively, always operate alternately. For example, when ram 55 is moved to the right, when viewed as shown in Figure 14, under the action of the pressure fluid, ram 58 is moved to the left, such action causing the boom to swing to the left.

After the boom has been swung into an operative position at the rear end of the truck, the operator may further manipulate clutch levers 119 and 134, indicated in Figures 8 and 9, thereby to cause drum 87 to operate and lift the outer end of the boom to the desired elevation. Bucket 15 may then be maneuvered into position to pick a load by manipulation of lever 182, shown in Figure 14, and levers 243 and 266, shown in Figure 10. Lever 182 controls the horizontal swinging of the boom, lever 243 controls the loading and dumping of the bucket, and lever 266 controls the raising and lowering of the bucket on the outer end of the boom. Clutches 99 and 101, and also drum 87, are provided with conventional brakes such as indicated at 129 in Figures 6. Each such brake is provided with a suitable foot pedal, which pedals are adapted to be selectively actuated by the operator to render the brakes effective to control the unwinding of cables 10, 12 and 17, from their respective drums.

Cranes of this type are frequently utilized for handling heavy equipment or machinery which may require accurate placement on a foundation, or in a specific location. When placing such heavy equipment on a foundation or in a truck, the lowering of the boom must be under positive control by the operator, in order to accurately place or spot the load in the desired location. To thus accurately lower a piece of heavy equipment onto a foundation, or into a truck, the downward movement of the boom is preferably controlled by power, and by manipulation of the brake 129 of drum 87. This may be accomplished by shifting clutch member 132 into driving engagement with clutch gear 130, whereby sprocket 128' is made free on shaft 114 (see Figure 9). Power is then transmitted from engine 103 through chain 112, clutch 117, shaft 114, gears 130 and 131, shaft 124, chain drive 127, to drum 87. When lifting heavy loads, the safety latch 137, shown in Figures 8 and 9, is utilized to prevent accidental unwinding of cable 10 from drum 87, should the clutch mechanism fail when a heavy load is suspended from cable 10.

The novel boom and bucket operating mechanism herein disclosed has been found extremely practical and efficient in actual operation. The touch control provided by the mechanism shown in Figures 11, 12 and 13 is of utmost importance, in that it greatly facilitates the operations of control levers 243 and 266, as the major portion of the pressure required on these levers to effect operation of their respective clutches is accomplished by fluid pressure, as a result of plungers 262 directly engaging the movable elements 235, shown in Figure 11.

The fluid pressure exerted on the control levers to provide the desired finger touch control may readily be varied by vertical adjustment of pivot pins 236, which support the pivoted elements 235, shown in Figure 11. By placing pivot pins 236 in apertures spaced closer to plungers 262, the effective leverage between connecting rods 241 and pistons 261 may be varied, as will be understood. Varying the tension in springs 263 by manipulation of turnbuckles 265, may also materially vary the amount of pressure exerted on the control levers by pistons 261 to provide the desired "feel." Thus, the operator may know at all times the approximate pressure required to effect operations of the various mechanisms.

The unique arrangement of cylinders 47 and 48 and their respective rams 57 and 58, in conjunction with chain 66, provides a very positive action for swinging the boom horizontally, whereby such swinging movement may be accomplished quickly and without shocks or jerks, as is often common when operating conventional cranes. Moreover, the double block-and-tackle arrangement of sprockets 63, 68 and chain 66, makes it possible to materially reduce the over-all length of the swing bed in that the length of cylinders 47 and 48 may be considerably shortened as a result of the reduced reciprocal travel of pistons 55 and 56, brought about by the double block-and-tackle action, shown in Figures 2 and 14.

The drum-operating clutches 99 and 101, shown in Figures 5, 6 and 7, constitute an important part of the operating mechanism, particularly when actuated by the finger touch control, illustrated in Figures 10, 11, 12 and 13. This combined mechanism, including the pneumatic accumulators 254, makes it practically impossible for the operator to cause the clutches to "grab," and impart a jerky action to the boom and bucket, because any sudden surge of pressure fluid in conduits 252 and 271 will be materially reduced by accumulators 254, before the effects thereof can be transmitted to the pistons 175 of clutch cylinders 161.

The location of the pivotal connections of the boom with the swing bed 5 is also of utmost importance, in that the weight of the load suspended from the boom is directed onto the swing bed at a location relatively close to the vertical axis a—a, about which the swing bed and boom rotate.

The novel construction of the pivotal mounting of the swing bed 5 on its supporting structure, such as the truck frame 2, including the hook rollers 44, house rollers 41, and the vertically disposed rollers 34, shown in Figures 2 and 3, is important in that these rollers cooperate with the vertical hub 33 and plates 28 and 36 to provide a freely rotatable mounting for the swing bed, whereby the swing bed and boom may be freely rotated about axis a—a, at all times, with minimum power, regardless of the load carried by the boom.

Another advantage gained by the unique construction of the anti-friction mounting of the swing bed and its operating mechanism resides in the provision of the chain tensioning device 69, shown in Figures 2 and 3, for taking up slack in chain 66. This tensioning device constantly maintains the chain 66 at the proper operating tension, whereby there is no looseness, nor play in the connections between sprockets and chain. When the chain is so tensioned, the swing bed may readily be swung smoothly over its full rotary movement, about axis a—a, without jerks, a highly desirable attribute in apparatus of this general type.

The foregoing detailed description has been given for clearness of understanding only, and no unnecessary limitations should be understood therefrom, and the appended claims should be construed as broadly as permissible in view of the prior art.

I claim as my invention:

1. The combination with a crane comprising a mobile frame having a swing bed mounted thereon for rotation about a vertical axis, a boom pivoted to the swing bed for swinging movement in a vertical plane, and a drag line bucket suspended from the outer end of the boom, of a cable winding mechanism for operating the boom and bucket, said mechanism comprising a first drum having a cable wound thereon and connected to the outer end of the boom for raising and lowering the boom, a second drum having a cable thereon, the free end of which has a running connection with the outer end of the boom and pendantly supports the bucket therefrom, and whereby the bucket may be raised or lowered relative to the boom, a third drum having a cable thereon, the free end of which is connected to the front end of the bucket, said first drum being mounted upon and secured to an independent shaft, and said second and third drums being mounted for relative rotation upon a common drive shaft having means for drivingly connecting it to a source of power, a driving connection between said independent shaft and said drive shaft, clutch means in said driving connection whereby said first drum may be operated to raise or lower the boom, friction means for operatively connecting said second and third drums to said drive shaft whereby they may be operated independently of one another to maneuver the bucket into position to pick a load, said drums and their respective drives being arranged in substantially a vertical plane to economize floor space and to render the operating parts thereof readily accessible, the driving connection between said independent shaft and said drive shaft including dual power drives, one for winding the cable onto said first drum to raise the boom and the other for controlling the unwinding of the cable from said first drum to facilitate accurately placing a heavy load suspended from the boom in a predetermined location, said dual drives including a counter-shaft having a drive operatively connecting it to said drive shaft, clutch means for rendering said drive operative to rotate the countershaft, said dual drives also including a chain drive for operatively connecting the counter-shaft to said first drum for rotating it in one direction, and a gear drive for rotating said first drum in the opposite direction, and a single clutch member for selectively rendering said dual drives operable to drive said first drum.

2. The combination with a crane comprising a mobile frame having a swing bed mounted thereon for rotation about a vertical axis, a boom pivoted to the swing bed for swinging movement in a vertical plane, and a drag line bucket suspended from the outer end of the boom, of a cable winding mechanism for operating the boom and bucket, said mechanism comprising a first drum having a cable wound thereon and connected to the outer end of the boom for raising and lowering the boom, a second drum having a cable thereon, the free end of which has a running connection with the outer end of the boom and pendantly supports the bucket therefrom, and whereby the bucket may be raised or lowered relative to the boom, a third drum having a cable thereon, the free end of which is connected to the front end of the bucket, said first drum being mounted upon and secured to an independent shaft, and said second and third drums being mounted for relative rotation upon a common drive shaft having means for drivingly connecting it to a source of power, a driving connections between said independent shaft and said drive shaft, clutch means in said driving connection whereby said first drum may be operated to raise or lower the boom, friction means for operatively connecting said second and third drums to said drive shaft whereby they may be operated independently of one another to maneuver the bucket into position to pick a load, the driving connection between said independent shaft and said drive shaft including dual power drives, one for winding the cable onto said first drum to raise the boom and the other for controlling the unwinding of the cable from said first drum to facilitate accurately placing a heavy load suspended from the boom in a predetermined location, said dual drives including a counter-shaft having a drive operatively connecting it to said drive shaft, clutch means for rendering said drive operative to rotate the countershaft, said dual drives also including a chain drive for operatively connecting the counter-shaft to said first drum for rotating it in one direction, a gear drive for rotating said first drum in the opposite direction, and a single clutch member for selectively rendering said dual drives operable to drive said first drum.

3. A friction clutch comprising in combination, a drive shaft having an enlarged disc secured thereto and rotatable therewith as a unit, a cable supporting drum adjacent to said disc and having its axis of rotation coincident with the axis of said drive shaft, said cable supporting drum having a friction drum secured to one end thereof and rotatable therewith as a unit, said friction drum extending over and substantially concealing said disc, said disc substantially closing the adjacent end of said cable supporting member, a friction band mounted on said disc and having one end pivotally anchored thereto, means for normally retaining the friction band in substantially concentric relation to the inner surface of said friction drum, when in contracted non-operative position, a cylinder having a closed end and pivoted to the disc adjacent to said band, a piston in said cylinder having a piston rod secured thereto and projecting from the opposite end of the cylinder, a bellcrank having its long arm pivoted to the projecting end of the piston rod, a link having one end pivoted to the short arm of the bellcrank, the opposite end of said link being pivotally connected to the free end of the friction band, an elongated supporting arm having one end pivoted to the intermediate portion of the bellcrank, the opposite end of said supporting arm being pivoted to the disc adjacent to the closed end of the cylinder, said elongated supporting arm providing a floating support for the bellcrank whereby the friction band may frictionally engage the inner surface of the drum when said band is expanded to effect a driving connection between the drive shaft and the cable supporting drum, yieldable means for retracting the piston rod and returning the bellcrank to its normal inoperative position, means for limiting the return movement of the piston rod, whereby the friction band is spaced from the inner surface of the drum around the circumference thereof when the friction band is in retracted position, thereby assuring uniform wear of the band and drum, a stud secured to the long arm of the bellcrank and having one end projecting laterally therefrom adapted to engage a stop for limiting return movement of the piston rod, the opposite end of said stud having one end of a tension device secured thereto, the opposite end of which is adjustably secured to the disc adjacent to the closed end of the cylinder, and means for supplying a pressure fluid to the cylinder to actuate the piston.

References Cited in the file of this patent

UNITED STATES PATENTS

| | | |
|---|---|---|
| 446,526 | Kennedy | Feb. 17, 1891 |
| 497,216 | Rogers | May 9, 1893 |
| 663,396 | Stone | Dec. 4, 1900 |
| 944,346 | Reece | Dec. 28, 1909 |
| 1,248,600 | Bathrick | Dec. 4, 1917 |
| 1,635,689 | Rauch | July 12, 1927 |
| 2,218,818 | Harrington | Oct. 22, 1940 |
| 2,322,151 | Matus | June 15, 1943 |
| 2,352,969 | Parsons | July 4, 1944 |
| 2,365,168 | Billings | Dec. 19, 1944 |
| 2,380,625 | Zeilman et al. | July 31, 1945 |
| 2,528,985 | Wunsch | Nov. 7, 1950 |
| 2,530,460 | Grundon | Nov. 21, 1950 |
| 2,532,342 | Sloane | Dec. 5, 1950 |
| 2,572,029 | Huston | Oct. 23, 1951 |
| 2,602,298 | Ashton | July 8, 1952 |
| 2,627,847 | Clark et al. | Feb. 10, 1953 |
| 2,633,649 | Page | Apr. 7, 1953 |
| 2,635,582 | Zeilman | Apr. 21, 1953 |
| 2,787,383 | Antos et al. | Apr. 2, 1957 |
| 2,790,568 | Mandt | Apr. 30, 1957 |
| 2,834,125 | Brant | May 13, 1958 |

FOREIGN PATENTS

| | | |
|---|---|---|
| 748,224 | Germany | Oct. 30, 1944 |
| 148,082 | Australia | Sept. 8, 1952 |

OTHER REFERENCES

Book—Moving the Earth, by Herber L. Nichols, Jr., North Castle Books, Greenwich, Connecticut, March 1955, Figures 17–28 (pages 17–22).